United States Patent [19]

Cartwright

[11] 3,739,100

[45] June 12, 1973

[54] DIAL AND MULTIFREQUENCY TELEPHONE SYSTEM EMPLOYING RINGING AND LAMP FLASH SIGNALLING

[75] Inventor: Delmar G. Cartwright, Pte. Claire, Quebec, Canada

[73] Assignee: Bell Canada, Montreal, Quebec, Canada

[22] Filed: Mar. 29, 1971

[21] Appl. No.: 128,691

[52] U.S. Cl. .. 179/18 AD, 179/16 EC, 179/18 GB, 179/18 HB

[51] Int. Cl. .... H04m 3/04

[58] Field of Search .... 179/18 AD, 16 EC, 179/1 H, 18 F, 18 G, 18 GA, 18 GB, 37, 84 R, 84 A, 99, 18 HB

[56] References Cited

UNITED STATES PATENTS

| | | | |
|---|---|---|---|
| 3,259,697 | 7/1966 | Brumfield et al. | 179/16 EC |
| 3,609,249 | 9/1971 | Pinede | 179/99 |
| 3,100,244 | 8/1963 | King et al. | 179/1 H |
| 3,089,000 | 5/1963 | Burgener | 179/84 R |
| 3,014,097 | 12/1961 | Apt | 179/18 AD |
| 3,582,562 | 6/1971 | Sellari | 179/18 AD |

*Primary Examiner*—Kathleen H. Claffy
*Assistant Examiner*—Randall P. Myers
*Attorney*—Rogers, Bereskin & Parr

[57] ABSTRACT

An intercom telephone system having a selector and selector control circuit to receive dial pulse digits. Ringing and lamp flash signals are applied to a called station through two levels of the selector. When some of the stations are tone (multifrequency) stations, a tone adapter circuit receives the tone digits, and causes the selector to step to a position corresponding to the digit received. As in the case of dial pulse digits, ringing and lamp flash are then applied to the called station through the levels of the selector.

7 Claims, 4 Drawing Figures

INVENTOR.
DELMAR G. CARTWRIGHT
BY Rogers, Bereskin & Parr

INVENTOR.
DELMAR G. CARTWRIGHT
BY *Rogers Bereskin & Parr*

PATENTED JUL 1 2 1973

3,739,100

SHEET 3 OF 4

INVENTOR.
DELMAR G. CARTWRIGHT
BY Rogers, Bereskin & Parr

INVENTOR.
DELMAR G. CARTWRIGHT
BY Rogers, Bereskin & Parr

DIAL AND MULTIFREQUENCY TELEPHONE SYSTEM EMPLOYING RINGING AND LAMP FLASH SIGNALLING

This invention relates to an intercom telephone system that can accommodate stations (i.e. telephones) some of which have ordinary dials, and some of which have tone dialling.

Intercom telephone systems are sometimes provided with stations having ordinary dials, which generate conventional dial pulses, and also with stations having multifrequency or tone dialling, which generate signals consisting of pairs of tones. Such systems usually employ so called "tone adapters," which are circuits that can receive and decode tone signals and which cooperate with and are controlled in part by the control circuit used in the system for receiving conventional dial pulses. A typical such adapter circuit is shown in Brumfield et al U.S. Pat. No. 3,259,697 issued July 5, 1966. A disadvantage of prior art systems such as the Brumfield et al system is that only one signalling path is available in the adapter circuit, so that such circuits are incapable of applying both lamp flash and ringing signals to a called station.

Accordingly, it is an object of the present invention to provide a system, employing a conventional tone adapter circuit, which can apply both ringing and lamp flash signalling to a called station in a simple way. In a preferred embodiment, the invention provides a selector switch and selector control circuit for conventional dial pulse signals, and also employs a tone adapter circuit which receives tone signals and which then causes the selector control circuit to step the selector switch to a position corresponding to the digit received. In the case of both dial pulse and tone signals, the ringing and lamp flash signals are then applied to the called station through contacts of the selector switch.

Further objects and advantages of the invention will appear from the following description, taken together with the accompanying drawings, in which.

Figure 1:
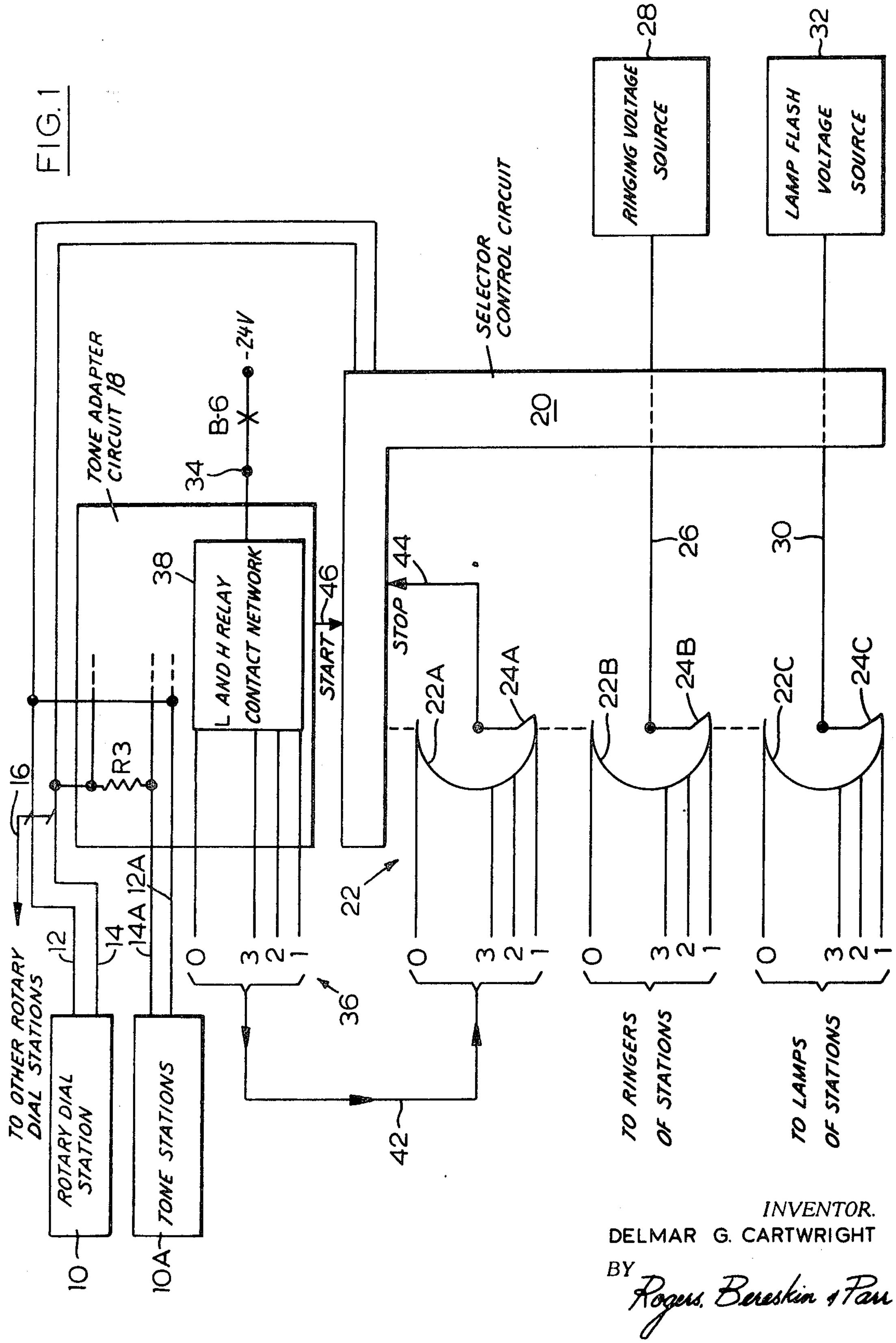
FIG. 1 is a simplified block diagram showing a preferred embodiment of the invention.

Reference is first made to FIG. 1, which shows a typical dial pulse intercom station 10 connected to tip and ring leads 12, 14. Other dial pulse intercom stations are also connected to the tip and ring leads 12, 14 as indicated by the branch leads 16. Intercom tone stations 10A are grouped separately and are connected by tip and ring leads 12A, 14A via a tone adapter circuit 18 to the leads 12, 14.

The tip and ring leads, 12, 14 are connected to a selector control circuit 20. The selector control circuit 20 controls the stepping of a selector switch 22 having three levels of contacts 22A, 22B, 22C, with respective wipers 24A, 24B, 24C. Each level of contacts has the usual 10 output terminals numbered from 1 to 0 as indicated. The output terminals of level 22B of the selector are connected to the ringers of the respective stations (it is assumed that there are up to 10 intercom stations connected in the system). The wiper 24B of selector level 22B is connected via ringing lead 26 and through the selector control circuit 20 to a source 28 of ringing voltage, so that when a call is made, ringing will be applied to the ringer of the called station. The output terminals of level 22C of the selector switch are connected to the lamps of the stations, and the wiper 24C of the selector level 22C is connected via a lamp flash lead 30 and through the selector control circuit 20 to a source 32 of lamp flash voltage.

The tone adapter circuit 18 is a conventional circuit which has been used and marketed by Bell Canada Limited for a number of years under its model number D2. This circuit, which will be explained in more detail presently, contains an input 34 and 10 output terminals 36 numbered from 1 to 0. The circuit 18 also contains L and H (low and high channel) relays (not shown in FIG. 1). When a pair of tones is received from a calling station, one L and one H relay in the circuit 18 operate to establish a path from the input 34 through a contact network 38 of the L and H relays to one of the output terminals 36 corresponding to the digit received. The input 34 is connected through a contact B–6 of a relay B (not shown) of the selector control circuit to −24 volts. The outputs terminals 36 of the tone adapter circuit are connected via leads 42 to the correspondingly numbered output terminals respectively of level 22A of the selector switch. The wiper 24A of selector level 22A is connected via a stop lead 44 (FIG. 1) to the selector control circuit 20.

In addition, the FIG. 1 system includes a start lead 46 extending from the tone adapter circuit 18 to the selector control circuit 20, for a purpose to be described.

The system shown in FIG. 1 operates generally as follows. When a subscriber at a station 10 lifts his telephone hand set, he connects together leads 12, 14 and this prepares the selector control circuit 20 for receipt of a digit. If the subscriber at a tone station 10A lifts his handset, connecting leads 12A, 14A together, this enables both the adapter circuit 18 and the selector control circuit 20.

If the subscriber has an ordinary rotary dial and dials a digit, e.g. "3," the opening and closing of leads 12, 14 as dial pulses are received causes the selector control circuit 20 to step the selector switch 22, causing the wipers 24A, 24B, 24C to step to the respective output terminals corresponding to the digit dialled. After dialling is completed, leads 12, 14 remain connected together, and this is recognized by the selector control circuit which then applies ringing and lamp flash voltages through selector levels 22B, 22C to the ringer and to the lamp of the called station. The selector control circuit 20 then steps the selector switch 22 back to its home position (in which the wiper arms are not connected to any output terminals).

If the calling station is a tone station, then when the caller presses a button for a particular number (e.g. "3"), this causes the tone adapter circuit 18 to perform two functions. Firstly, ground is applied over the start lead 46 to the selector control circuit 20 to start the stepping switch 22 stepping. The wipers of the selector switch then continue to step past their respective output terminals 1, 2 etc. until the stepping is terminated by a stop signal on stop lead 42. This stop signal is applied as a result of the second function of the tone adapter circuit.

The second function which the tone adapter circuit performs after receipt of the signal from the caller is that its contact network 38 operates to connect its input 34 through to the output terminal 36 corresponding to the digit dialled (in this case "3"). This connects −24 volts through operated contact B–6 to output terminal "3" of the tone adapter circuit. (As will be explained presently, relay B in the selector control circuit operates at all times when the selector control circuit is activated, i.e. whenever a station has its telephone hand set off-hook.)

When the wiper 24A of level 22A of the selector reaches output terminal "3," −24 volts is applied through the tone adapter circuit, through leads 42 and selector level 22A, and over the stop lead 44 to the selector control circuit to stop the selector switch.

When the selector switch stops, the selector control circuit then acts as it would have if the selector had stopped following receipt of the last of a train of conventional dial pulses. The selector control circuit 20 applies ringing and lamp flash voltages through selector levels 22B, 22C to the ringer and lamp of the called station, and after this it steps the selector switch back to its home position.

It will be seen that the system illustrated enables use of a tone adapter circuit having only one path therethrough, since the ringing and lamp flash voltages are applied through two levels of the selector switch. The selector switch must of course be provided in any event to deal with stations having conventional rotary dials. The system therefore provides an inexpensive and simple capability for handling both types of signalling.

Figure 2:
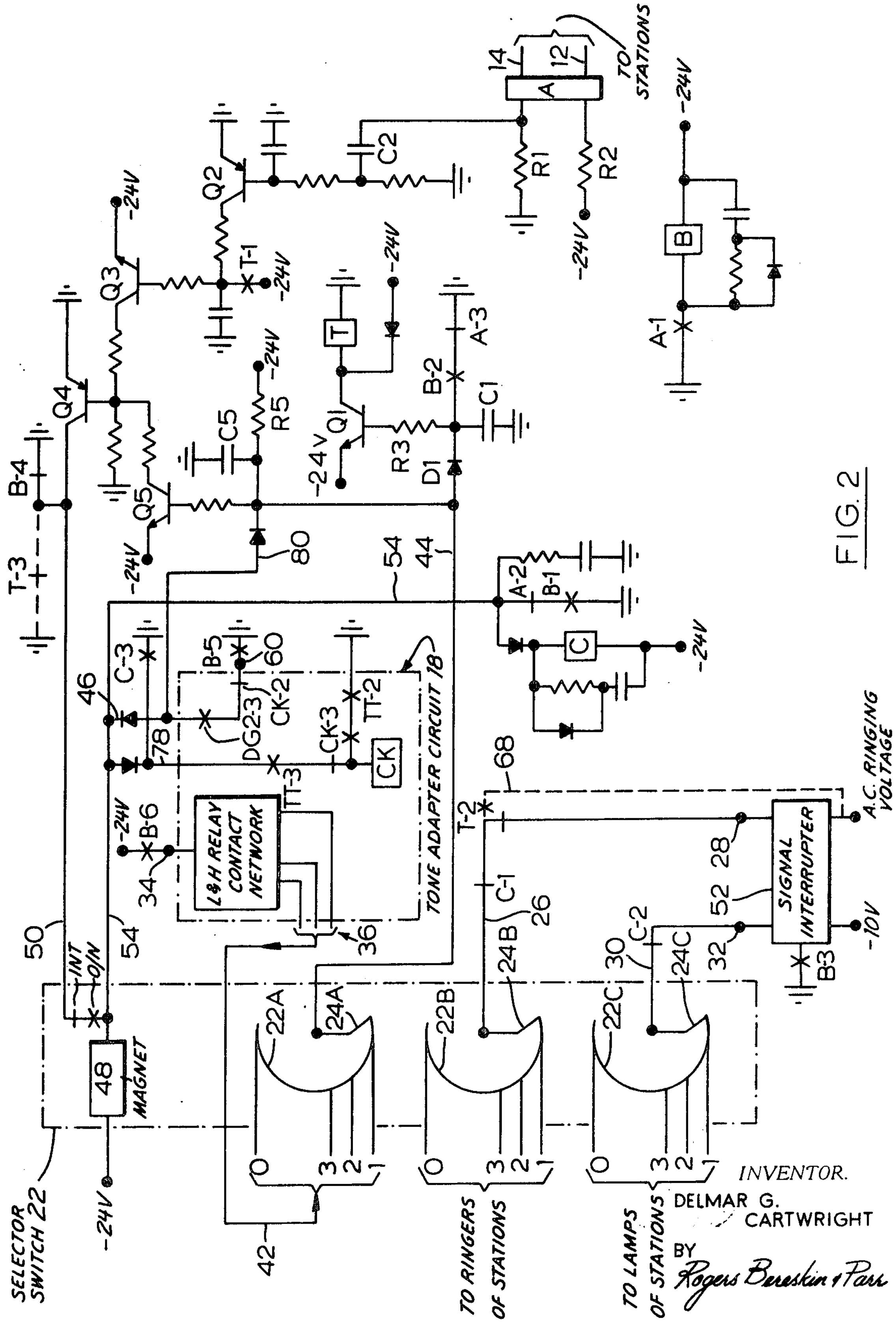
FIG. 2 shows a detailed circuit for the block diagram of FIG. 1.

Reference is next made to FIG. 2 which shows in detail a circuit for the system of FIG. 1. In the FIG. 2 circuit, blocks are shown labelled "Tone Adapter Circuit 18," "Selector Switch 22," and "Signal Interrupter 52." Apart from these blocks, all of the FIG. 2 circuit is that of the selector control circuit 20.

The selector switch shown in the FIG. 2 circuit is of the type made by C.P. Clare (Canada) Limited under its model No. NSQ4131-L1. The selector switch includes a magnet 48, and a homing lead 50 containing off normal contacts O/N and interrupter contacts INT. Contacts O/N close only when the selector switch is away from its home position (in the home position, wipers 24A, 24B, 24C are disconnected from the selector output terminals), and interrupter contacts INT operate and open only when the selector magnet is operated, i.e. energized. The selector switch operates by moving one step each time the magnet 48 is de-energized.

The FIG. 2 circuit also includes a line relay A, slow release relays B and C, a very slow release relay T (made slow release by transistor Q1), and transistors Q2 to Q5 connected as shown. The circuit of FIG. 2 is best explained by a description of its operation, which is as follows.

When the subscriber at a rotary dial station 10 lifts his hand set, connecting leads 12, 14 together, current flows through resistors R1, R2 to operate line relay A. Contact A–1 then operates relay B, which is slow release. Contact B–1 closes to prepare an operate path for the selector magnet 48 and for relay C, and contact B–2 closes to prepare an operate path for relay T. Contact B–3 closes to operate a signal interrupter 52 which supplies interrupted −10 volts at output 32 for lamp flashing and which also interrupts the ringing voltage to provide an interrupted ringing voltage at output 28.

When the calling party operates his dial, a series of dial pulses is received and relay A releases and reoperates at each dial pulse. Relay B is slow release and remains operated during pulsing. Each time relay A releases, contact A–2 closes to energize the magnet 48 through operated contact B–1 and lead 54, and each time relay A reoperates at the end of a dial pulse, the magnet 48 releases, causing the selector switch to step one position. The selector switch therefore steps to a position corresponding to the digit dialled.

In addition, relay C operates at the receipt of the first pulse, due to release of contacts A–2. Relay C is also slow release and remains operated during pulsing. Contact C–1 opens the ringing lead 26 to prevent application of the ringing signal to the output terminals of the selector level 22B during stepping. Contact C–2 similarly opens the lamp flash lead 30 to prevent application of a lamp flash voltage to the output terminals of selector level 22C during stepping.

In addition, when relay A releases for the first time upon receipt of the first dial pulse, its contact A–3 closes to turn on transistor Q1 and operate relay T. Relay T is very slow release because of the long time constant of capacitor C1 and resistor R3, which maintain transistor Q1 operated for 1 ½ to 3 seconds after the ground is removed from the base of transistor Q1. Relay T thus remains operated during dial pulses.

When relay T operates, its contact T–1 applies −24 volts to the base of transistor Q3, thus preventing transistor Q3 and hence transistor Q4 from operating. This prevents premature return of the selector to its home position during dialling, as will be explained. Contacts T–2 operate to open the path for application of the ringing voltage to wiper 24B.

After dialling is completed, relay A reoperates and contacts A–2 open to de-energize the selector magnet 48, thus completing the stepping. The selector switch is now in an off normal position with contacts O/N closed and contacts INT also closed.

In addition, with contacts A–2 now open, relay C releases. The lamp-flash voltage is then applied through contacts C–2 and selector level 22C to the lamp of the called station. Relay T releases (due to opening of contacts A–3) shortly after relay C. Contacts T–2 then release to apply the ringing voltage through contacts C–1 and selector level 24B to the ringer of the called station. A series of rings at the called station then occurs.

When the called party answers, this creates a second loop on the tip and ring leads 12, 14 to relay A. This causes a sudden increase in current in the tip and ring leads, causing a negative going pulse to be connected from the right hand side of resistor R1 through capacitor C2 to the base of transistor Q2. This turns on transistor Q2, which then turns on transistor Q3 (since relay T is released) and transistor Q3 turns on transistor Q4. Each transistor has a gain of between 50 and 200, so that the resultant gain is sufficiently high to generate a current of about one ampere at the collector of transistor Q4.

When transistor Q4 turns on, it grounds homing lead 50, and since contacts INT, O/N are closed, the magnet 48 operates. As soon as the magnet 48 operates, contacts INT open, causing the magnet to release and to step the wipers one position. Contacts INT close when the magnet releases, so that the magnet reoperates. The selector thus continues to step until it reaches its home position, at which time contacts O/N open and terminate the stepping.

To prevent premature operation of transistor Q4 caused by possible operation of transistor Q1 during dialling, transistor Q3 is as mentioned disabled by contacts T–1 during dialling.

During the stepping to home position, the ground on homing lead 50 is connected via lead 54 to relay C to operate the C relay. This opens contacts C–1 and C–2 to disconnect the ringing and lamp flash voltages from the selector levels 22B, 22C, so that as the selector switch homes, these voltages are not applied to the various output terminals.

If the called party fails to answer, then when the calling party replaces his handset, relays A and B release. Contact B–4 grounds the homing lead 50, causing the selector to return to its home position as previously described and also operating relay C during the homing process.

If the calling party is a tone station 10A, then when the handset at this station is lifted, relay A operates as before, via leads 12A, 14A and the loop in station 10A. Since there are no dial pulses, relay A remains operated. Relay B operates as before, and contacts B–1 prepare an operate path for the magnet 48. Contacts B–2 close but perform no function. Contacts B–3 ground the start lead to the signal interrupter 52; contacts B–4 remove ground from homing lead 50, contacts B–5 ground terminal 60 to the tone adapter circuit 18 to provide a system off-normal ground for circuit 18; and contact B–6 (also shown in FIG. 1) applies −24 volts to the input lead 34 of the tone adapter circuit 18.

Figure 3:
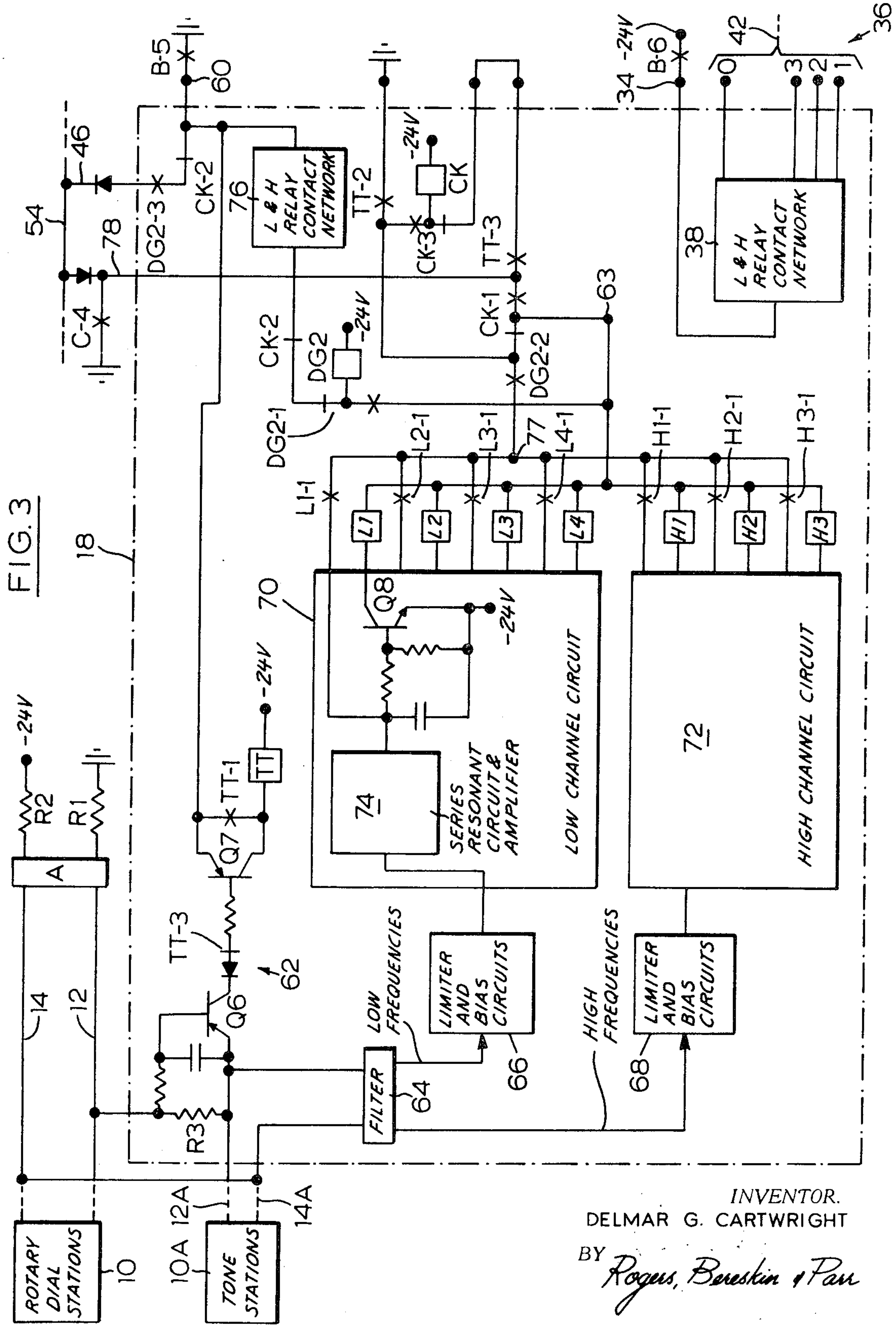
FIG. 3 is a simplified block diagram of a tone adapter circuit.

As indicated, the tone adapter circuit 18 is conventional and is illustrated in simplified block form in FIG. 3. As shown, the adapter circuit 18 includes a resistor R3 connected in series in the tip lead 12A. When a tone station 10A goes off-hook and operates relay A, the voltage developed across resistor R3 operates a transistor Q6 in a detector 62. Transistor Q6 operates transistor Q7 which operates a relay TT by connecting relay TT to the system off-normal ground at terminal 60. Relay TT locks operated via contact TT–1 to terminal 60, and its contact TT–2 closes to provide off-normal ground (through contact CK–1 of a relay CK) at terminal 63 to various parts of the adapter, enabling it for receipt of digits. Contact TT–3 disables transistors Q6, Q7.

Digits are represented by a pair of tones, one low and one high. There is a choice of four low tones and three high tones. When a pair of tones representing a digit is received, the low and high tones are separated by a filter 64, and the respective tones are applied through limiter and bias circuits 66, 68 to low and high channel circuits 70, 72 respectively. The low channel circuit 70 contains four series resonant circuits and amplifiers and the high channel circuit contains three, one for each tone. Only one such resonant circuit and amplifier is shown, indicated at 74. When a tone is received, the series resonant circuit for that tone (e.g. circuit 74) operates a detector transistor, one of which is shown at Q8. The detector transistor operates its associated channel relay. As shown, the low channel circuit 70 contains four low channel relays L1 to L4, and the high channel circuit 72 contains three high channel relays H1 to H3, each connected to the off-normal ground at terminal 63 and operating to −24 volts when its associated detector transistor operates.

In addition when a pair of tones is received, relay DG2 operates, via contacts DG2–1 released, CK–2 released, a contact network 76 of the operated L and H relays, and the ground at terminal 60. When relay DG2 operates, it locks operated via contacts DG2–1 to the off-normal ground at terminal 63, and contacts DG2–2 and TT–2 connect ground to terminal 77. Terminal 77 is connected via normally open contacts of the respective L and H relays to the bases of the respective detector relays, e.g. terminal 77 is connected via contact L1–1 to the base of transistor Q8. Thus when any L or H relay operates, it is held operated by its associated detector relay under control of relay DG2.

As previously indicated, when an appropriate pair of L & H relays operates, the input 34 to the L and H relay contact network 38 is connected to an appropriate one of the outputs 36, depending on the digit received.

As applied to the present circuit, when relay DG2 operates upon receipt of a digit, its contact DG2–3 closes, connecting ground from terminal 60 via released contacts CK–2 through start lead 46 to lead 54. This operates the magnet 48. In addition the ground from terminal 60 performs four further functions.

Firstly, the ground from terminal 60 operates relay CK in the adapter circuit, via leads 46, 54, 78, contact TT–3 operated, and contact CK–3 released. Secondly, it operates relay C via lead 54, thus removing ringing and lamp flash voltages from the selector wipers 24B, 24C in preparation for stepping of the selector. Thirdly, the ground from terminal 60 operates relay T, via lead 80. Fourthly, also via lead 80 it turns on transistor Q5, which operates transistor Q4, applying ground to homing lead 50.

When relay CK operates, it locks operated through contacts CK–3 and TT–2. Its contacts CK–2 shift the locking path for relay DG2 through lead 78 and contact C–4. Its contacts CK–2 remove the ground from leads 54, 80, releasing magnet 48 and causing it to advance one step. With the magnet 48 released, contacts INT close, and since the selector is in an off-normal position, contacts O/N are closed, allowing the ground on homing lead 50 to reoperate magnet 48. Contacts INT then open, and the selector continues to step. The ground on homing lead 50 remains present, even though the ground on lead 80 has been removed from the base of transistor Q5, because of the relatively long time constant of resistor R5 and capacitor C5 connected to the base of transistor Q5, which keep transistor Q5 on for a period after the lead 80 ground is removed.

When the selector switch reaches a position in which wiper arm 24A reaches the output terminal connected via leads 42 to the tone adapter circuit input 34, and hence through contacts B–6 to −24 volts, then −24 volts is applied through the L and H contact network 38 to the selector wiper 24A and through stop lead 44 to the base of Q5 to positively turn off transistor Q5. Thus turns off transistor Q4, removing ground from homing lead 50 and preventing the selector switch from continuing its stepping. Relay T remains operated as capacitor C1 continues to discharge, since diode D1 prevents application of −24 volts to the base of transistor Q1.

With the selector switch now stationary, and with ground removed from homing lead 50, relay C releases, causing application of the lamp flash voltage through selector level 22C to the called station as in the case of dial pulse operation. When relay T releases, which will be between 1 ½ and 3 seconds after the ground on lead 66 is removed, contacts T–2 operate to apply ringing voltage to the called station, as before. When the called party answers, transistors Q2, Q3, Q4 operate, causing the selector switch to return to its home position as previously described.

In addition, when relay C releases at the commencement of the ring, its contact C–4 removes the ground from lead 78, releasing relay DG2. Contact DG2–2 removes ground from terminal 77, causing release of the operated L and H channel relays in the adapter circuit 18. Relay CK remains operated via contacts TT–2 until relay TT releases, which will be when all tone stations 10A are on-hook.

If only a single short ring at the called station is desired when calls are made, then ringing lead 26 is disconnected from the signal interrupter 52 and instead is connected through a normally released contact of contacts T–2 and through lead 82 (shown in dotted lines) to the A.C. ringing voltage supply. In addition homing lead 50 may be connected through contact T–3 to ground as also shown in dotted lines.

With this arrangement, when a call is made for example by a station having a rotary dial, as soon as the selector switch reaches a position corresponding to the digit dialled, and relay C releases, both ringing and lamp flash voltages are applied to the called station. Relay T then releases. Contacts T–2 release to terminate the ring, and contacts T–3 release to ground the homing lead 50, thus returning the selector to its home position. The calling party may then redial if he wishes. The operation is similar for a call made by a tone station.

Figure 4:
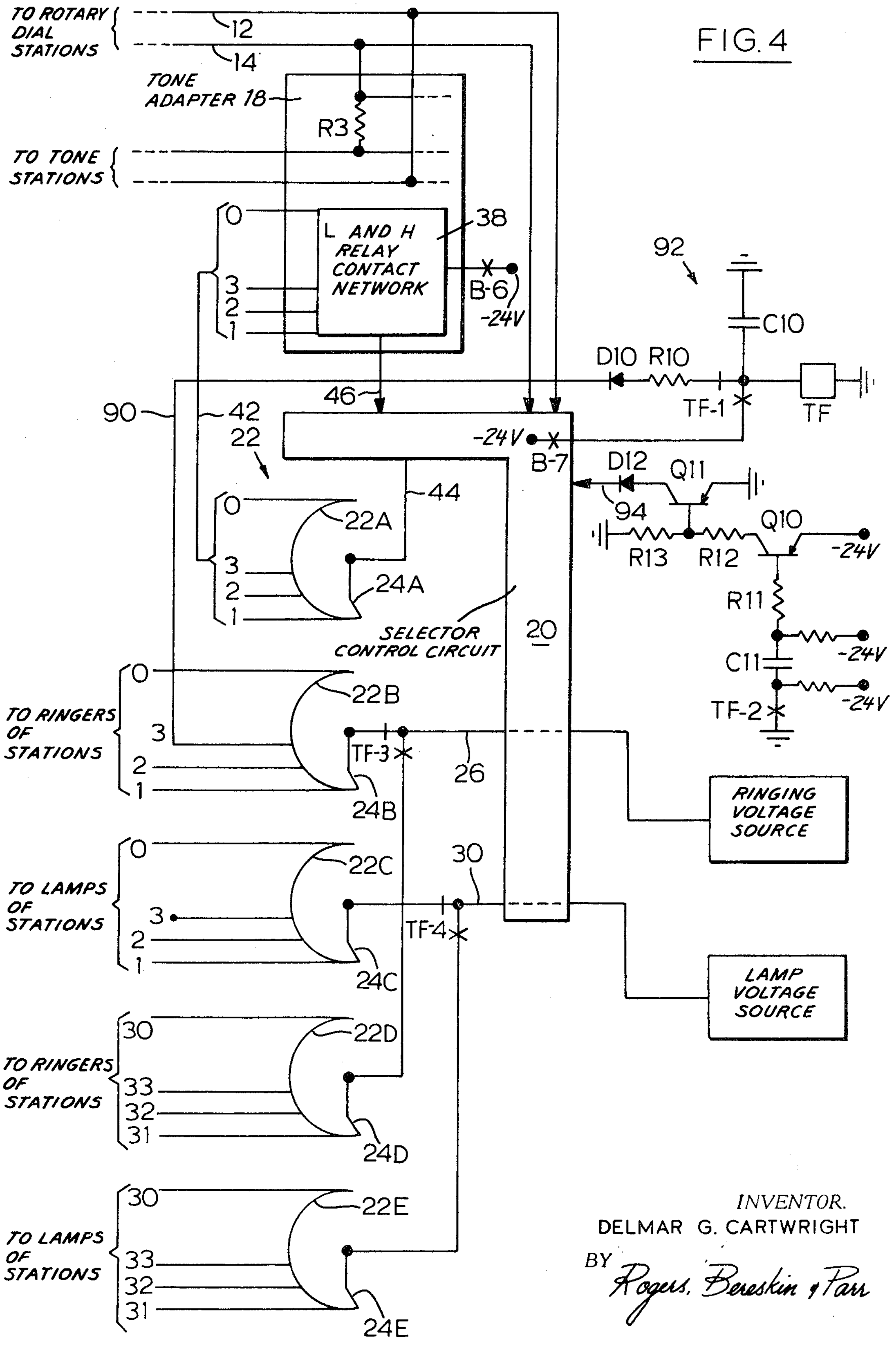
FIG. 4 is a block diagram similar to that of FIG. 1 but modified to include a transfer circuit.

When more than 10 codes are required, a transfer circuit must be provided, and a preferred transfer circuit for one additional group of nine two digit codes is shown in FIG. 4. For the transfer circuit of FIG. 4 two extra selector levels 22D and 22E are added, for ringing voltage and lamp flash voltage respectively. The selector level 22D and 22E include wipers 24D and 24E respectively.

It is assumed by way of illustration that the first digit of the two digit codes is "3." Accordingly, the output terminal numbered "3" of selector level 22B is disconnected from the intercom station to which it may have been connected and is connected instead via lead 90 to a transfer circuit 92. The transfer circuit 92 includes a rectifying circuit consisting of diode D10, resistor R10, and capacitor C10, connected between lead 90 and a transfer relay TF. In addition, the transfer circuit includes transistors Q10, Q11. The emitter of transistor Q10 is connected to −24 volts, while its base is connected through resistor R11, capacitor C11, and contacts TF–2 to ground. Each side of capacitor C11 is connected through a resistor to −24 volts. The collector of transistor Q10 is connected through resistors R12, R13 to ground, while the junction of resistors R12, R13 is connected to the base of transistor Q11. The emitter of transistor Q11 is connected to ground, while the collector of transistor Q11 is connected through diode D12 and lead 94 to lead 44 in FIG. 2, and hence to the base of transistor Q5.

Output terminal 3 of selector level 22C is open circuited, since there is now no station having the telephone number "3."

The operation of the transfer circuit shown in FIG. 4 is as follows. Assume that a station of the type which transmits ordinary dial pulses transmits the first digit "3" of a two digit code. The circuit then functions as previously described to step the selector switch to its position "3". Ringing voltage is then applied over ringing lead 26 to output terminal "3" of selector level 22B, and then through lead 90 to diode D10, resistor R10 and capacitor C10. The ringing voltage is there rectified and the resultant d.c. signal causes transfer relay TF to operate. Relay TF then locks operated through contacts TF–1 and B–7 and remains operated for the duration of the call.

When relay TF operates, its contacts TF–2 close and operate transistors Q10, Q11 for a brief interval only. The operation of transistors Q10, Q11 is brief because as soon as capacitor C11 in the base circuit of transistor Q10 charges, the base of transistor Q10 returns to −24 volts and transistor Q10 is biased off again.

During the brief time interval when transistors Q10, Q11 are operated, ground is applied from the collector of transistor Q11 through lead 94 to lead 44 of the selector control circuit to turn on transistor Q5. Transistor Q5 turns on transistor Q4, applying ground over homing lead 50 to the selector magnet 48 causing the selector to begin stepping to its home position. As before, transistors Q4, Q5 remain on sufficiently long, due to the time constant of resistor R5 and capacitor C5, to allow the selector switch to return to its home position.

If the selector control circuit includes contacts T–3 which return the selector to its home position immediately following a ring, then transistors Q10, Q11 and lead 94 are not needed.

When the selector has returned to its home position, the circuit is ready for the second digit to be dialled. At this time, contacts, TF–3 have transferred the ringing lead 26 to selector level 22D, and contacts TF–4 have transferred the lamp flash lead 30 to selector level 22E. The output terminals of these levels are numbered 31, 32, 33, up to 30, since the first digit required to reach the selector levels is "3."

When the second digit is dialled, the circuit operates in the manner previously described, to connect the ringing and lamp flash leads to the output terminals of selector levels 22D, 22E corresponding to the second digit dialled.

When the call is completed and the circuit released, relays A and B release, and contacts B–7 release the transfer relay TF, restoring the circuit to idle condition.

When a tone signal is received, the transfer circuit operates in the same manner as described for a dial pulse signal. After receipt of the first digit, the selector control circuit 20, under control of the tone adapter circuit 18, causes the selector switch 22 to step to a position corresponding to the digit dialled, as previously described for tone operation. Assume that this digit is "3," as before. Ringing voltage is then applied to output terminal "3" of selector level 22B to operate the transfer circuit, and the transfer circuit then causes the selector control circuit to return the selector switch to its home position in readiness for receipt by the tone adapter circuit of the second digit. The relay contact network 38 of the tone adapter circuit is cleared for receipt of another digit due to release of relay DG2 by contacts C–4. When the second digit is received, the circuit operates as previously described to connect the ringing and lamp flash leads to the output terminals of selector levels 22D, 22E corresponding to the second digit dialled.

Although the switching mechanism described has been a selector switch, the invention is not limited to use of a selector switch. Other suitable switching means can be used to route ringing and lamp flash signals to the called station. For example, two relay trees of the conventional type illustrated in Canadian Patent No. 836,658 issued Mar. 10, 1970, inventor Derek Leyburn, may be used. Such relay trees have a coil network containing five relays (see FIG. 3 of the patent), and a counting contact network (see FIG. 5 of the patent) containing contacts of the five relays. The relays of the coil network are actuated in successive different combinations as relay A releases and reoperates during receipt of dial pulses, and as such relays operate, the contacts in the counting contact network connect an input to successive different outputs depending on the digit received.

In accordance with the invention, two such relay trees may be used, one for the ringing signal and one for the lamp flash voltage. For dial pulse stations, the relay trees will be controlled in conventional manner by relay A to route the ringing and lamp flash signals to the station dialled. In addition, the relays of the relay trees will be connected to appropriate contacts of the routing relays in the tone adapter, so that when a particular pair of routing relays operates in the tone adapter, this operates the relays in the relay trees corresponding to the digit received by the tone adapter. Control means will also be provided to recognize completion of receipt of a digit and then to apply ringing and lamp flash signals to the inputs of the relay trees.

What I claim is:

1. A telephone system comprising:

a. means for connection to a plurality of rotary dial or tone stations or both, b. a selector switch having a plurality of contact levels, each contact level having a wiper and a plurality of contacts engageable by said wiper, said contacts of each contact level representing the respective digits represented by dial signals received from a calling station, c. said selector switch including a selector control circuit coupled to said means (a) and responsive to receipt of dial pulses received over said means (a) to advance said wipers of each contact level to the contact of each such contact level representing the digit dialled, d. a tone adapter circuit coupled to said means (a) and adapted to receive tone signals, said tone adapter circuit including decoding means having a plurality of outputs representing dialled digits and responsive to receipt of a tone signal by said tone adapter to energize one of said outputs, e. means connecting the outputs of said decoding means to the contacts of a first said contact level of said selector control circuit, f. means connecting said selector control circuit to said decoding means, said selector control circuit operative in response to receipt of a tone signal representing a particular digit by said tone adapter circuit to operate said selector control circuit to advance said selector switch to a position in which said wipers of each contact level engage the contact of each such contact level representing said particular digit, g. means for connection to a source of ringing voltage, h. means for connection to a source of lamp flash voltage, i. means for connecting said means (g) to said wiper of a second said contact level, j. means for connecting said means (h) to said wiper of a third said contact level, k. at least some of said contacts of said second and third contact levels being coupled to respective said subscriber stations.

2. A telephone system comprising:

a. means for connection to a plurality of stations rotary dial or tone stations, or both, b. a selector switch having at least three contact levels, each level having a wiper and a plurality of contacts contactable by said wiper, said selector switch having a home position and being operable to advance said wipers from said home position past said contacts back to said home position, said contacts of each level being associated with respective digits represented by dial signals received from a calling station, c. a selector control circuit coupled between said means (a) and said selector switch for controlling said selector switch dependent upon dial pulses received over said means (a), thus to step said wipers of said selector switch to respective contacts corresponding to the digit dialled, said selector control circuit further including first input means responsive to a predetermined start signal to start stepping of said selector switch and second input means responsive to a predetermined stop signal to stop stepping of said selector switch, d. a tone adapter circuit coupled to said means (a) and adapted to receive tone signals, said tone adapter circuit including an input and a plurality of outputs, and decoding means adapted to connect said input to a selected output dependent upon the digit represented by the tone signal received over said means (a), e. said tone adapter circuit including start means connected to said first input means of said selector control circuit and responsive to receipt of a tone signal by said tone adapter circuit for applying a said start signal to said first input means of said selector control circuit, f. means for connecting a source of said predetermined stop signal to said input of said tone adapter circuit, g. means connecting the respective outputs of said tone adapter circuit to respective corresponding outputs of one level of said selector switch, and means connecting said wiper of said one level to said second input means of said selector control circuit, h. means for connection to a source of ringing voltage, i. means for connection to a source of lamp flash voltage, j. means for connecting said means (h) to said wiper of a second level of said selector, k. means for connecting said means (i) to the wiper of the third level of said selector, l. at least some of said contacts of said second and third levels of said selector switch being coupled to respective said subscriber stations so that when a dial pulse representing a digit is received over said means (a), said selector control circuit responds to step said selector switch to a position corresponding to the digit dialled, and when a tone signal representing a digit is received over said means (a), said tone adapter circuit causes said selector control circuit to cause said selector switch to step to a position corresponding to the digit represented by the tone signal received, and in both cases, said ringing and lamp flash voltages are applied to the called station through said contacts of said second and third levels of said selector switch.

3. A system according to claim 2 wherein said selector control circuit includes sensing means operative upon receipt by said selector control circuit of a signal indicating an off-hook condition at a said subscriber station; a source of said start signal, and means responsive to operation of said sensing means for coupling said source of said start signal to said start means of said tone adapter to enable said start means.

4. A system according to claim 3, wherein said selector switch includes a stepping magnet, a homing circuit connected to said magnet for energizing said magnet, said homing circuit containing in series a normally closed interrupter contact which is open when said magnet is energized and a normally open off-normal contact which is closed when said selector switch is is a position other than its home position, said selector control circuit including an operate lead also connected to said magnet to energize said magnet, said first input means of said selector control circuit being connected to said operate lead so that application of said start signal by said tone adapter circuit to said first input means energizes said operate lead thus to energize said magnet, said selector control circuit and tone adapter circuit including cooperating means responsive to receipt of said start signal by said selector control circuit to terminate application of said start signal by said tone adapter circuit to said selector control circuit, thus to release said magnet, whereby to step said selector switch from its home position, said selector control circuit further including means responsive to respect of said start signal to energize said homing lead to cause said selector switch to step past said contacts back toward its home position, said second input of said selector control circuit including means responsive to receipt of said stop signal to de-energize homing lead thus to stop said selector switch when said selector switch reaches a position corresponding to the represented by the tone signal received by said tone adapter circuit.

5. Apparatus according to claim 4 including means for stepping said selector switch to its home position when a called party answers, such means comprising detector means coupled to said means (a) to detect extra current flowing in said means (a) when said called party answers, and amplifier means coupled to said detector means and responsive to operation of said detector means to energize said homing circuit thus to cause return of said selector switch to its home position.

6. Apparatus according to claim 5 wherein said means (a) comprises a pair of tip and ring leads coupled to each of said subscriber stations; said detector means comprising a transistor having an output and means coupling said transistor to one of said tip and ring leads for operating said transistor for a first predetermined interval following said increase in current, said amplifier means comprising a second transistor connected to said output of said first transistor, and having an output, and a third transistor connected to the output of said second transistor, capacitor means coupled to said second transistor to maintain said second transistor operated for a second predetermined interval following termination of operation of said first transistor, the sum of said first and second predetermined intervals being longer than the time required for said selector switch to step to its home position, said third transistor including an output adapted to be connected to said homing lead.

7. A system according to claim 2 wherein said selector switch includes fourth and fifth levels, each containing a plurality of contacts and a wiper; a transfer circuit; means connecting a selected contact of said second level of said selector to said transfer circuit; said transfer circuit including means responsive to receipt of a ringing signal from said selected contact of said second selector level for transferring said means (h) and (i) to the wipers of said fourth and fifth levels respectively of said selector, and for energizing said homing lead to return said selector switch to its home position preparatory to receipt of another dial signal.

* * * * *